United States Patent [19]
Pronovost et al.

[11] 3,756,022
[45] Sept. 4, 1973

[54] EXTERNAL COMBUSTION ENGINE

[76] Inventors: Jacques O. Pronovost; Burke A. Brown, both of 34 Farrington Dr., Willowdale, Ontario, Canada

[22] Filed: June 7, 1971

[21] Appl. No.: 152,459

[52] U.S. Cl................. 60/59 R, 123/1, 123/122 A, 60/59 T, 60/327
[51] Int. Cl............................................ F01k 27/00
[58] Field of Search.................... 60/59 T, 59 R, 36, 60/56, 327; 123/122 A, 1

[56] References Cited
UNITED STATES PATENTS
2,298,625 10/1942 Larrecq.............................. 60/59 T
2,539,255 1/1951 Karrer et al....................... 60/59 T X
3,163,004 12/1964 Spillmann et al................ 60/59 T X FOREIGN PATENTS OR APPLICATIONS
14,245 6/1906 Great Britain......................... 60/36

*Primary Examiner*—Edgar W. Geoghegan
*Attorney*—Daniel G. Cullen, Bernard J. Cantor et al.

[57] ABSTRACT

An external combustion engine whose working mechanism is operated by unburned, compressed, hot gas, which gas is heated, after compression and before entering the engine, by a flame-type combustion heater whose flame is produced by the hot gas exhausted from the engine.

2 Claims, 2 Drawing Figures

PATENTED SEP 4 1973　　　　　　　　　　　　　　　　3,756,022

INVENTORS
JACQUES O. PRONOVOST
BURKE A. BROWN

BY Cullen, Sottle, Sloman & Cantor

ATTORNEYS

EXTERNAL COMBUSTION ENGINE

BACKGROUND OF INVENTION

In a conventional combustion-type engines, as for example gas turbines, the engine working mechanism is operated by compressed and burned gas. Generally, such gas expands and gives up some, but not all, of its heat energy to the working mechanism (e.g., bladed wheels) and then is exhausted.

Since the exhausted gas is still hot, containing much unused heat energy, where it is exhausted to atmosphere, the heat energy is lost altogether. Thus, in some engines, some of this heat is recouped by passing the heated gas through a suitable heat exchanger to help preheat the gas fed to the engine working mechanism. Nevertheless, most of its heat energy is still wasted when it is finally exhausted.

Moreover, in such type engines, when the gas is burned before entry into the engine working mechanism, it is at a considerably higher temperature than necessary for efficient engine operation, thus wasting much of its heat and in effect, requiring some cooling before brought into the range where it produces useful work in conjunction with the engine mechanism.

The foregoing is generally applicable whether the engine be of a rotary or turbine type or of a reciprocating type. In either type of engine, most of the input energy, meaning the energy of combustion of the input gases, is wasted and only a small portion of the input energy is actually utilized in producing useful engine output. Thus, conventional engines are highly inefficient in engine output as compared to energy input.

Thus, the engine herein relates to an improvement to external combustion engines, which increases the efficiencies thereof and makes a much greater or effective use of the available energy of the fuel.

SUMMARY OF INVENTION

The invention herein which is applicable to both rotary or turbine types, as well as reciprocating types of external combustion engines, contemplates utilizing compressed and preheated, but unburned, gas as a working gas medium to operate the engine working mechanism, which gas is burned after exhaust from the engine, with the heat of the combustion utilized to heat the unburned gas entering the engine.

As an example of this invention, atmospheric air may be compressed and heated in a suitable heating chamber, then flowed into the engine working mechanism for operation thereof. Thereafter it is exhausted from the engine, after the usual expansion and transfer of part of its energy to the engine working mechanism. The exhausted, but still hot air, is then utilized with a suitable fuel to provide a hot flame which is applied to the heating chamber for heating the air flowing to the engine in the first place. The preheated air which already has served one function, namely, operating the engine working mechanism, then serves a second function of providing heated oxygen to the flame, thus producing a much more efficient and better heat energy source.

These and other objects and advantages of this invention will become apparent upon reading the following description, of which the attached drawings form a part.

DETAILED DESCRIPTION

Figure 1:
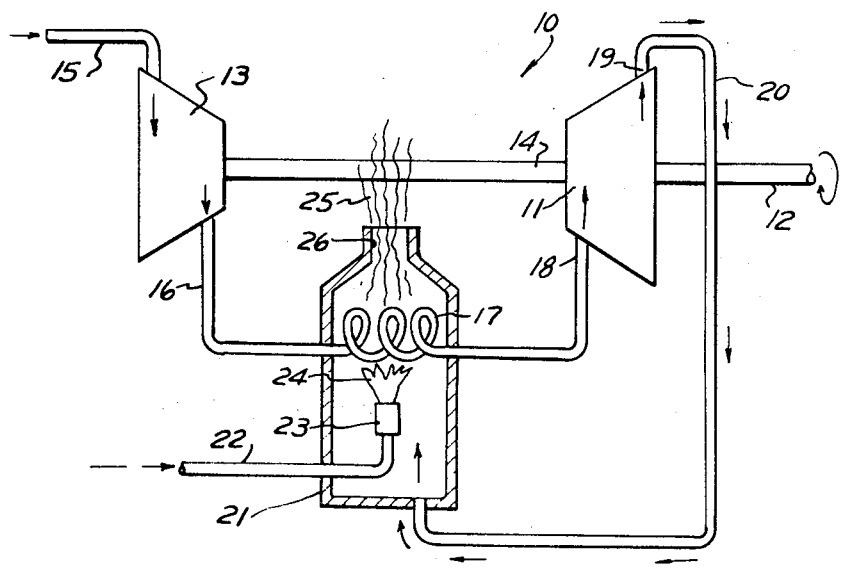
FIG. 1 is a schematic illustration of a gas turbine type of engine utilizing the invention hereof.

FIG. 1 schematically illustrates a gas turbine type of external combustion engine apparatus 10 which comprises a turbine 11 having a power output shaft 12. A compressor 13 is coupled to the power output shaft by means of a shaft extension 14. The turbine and compressor are shown schematically as their constructions form no part of the invention herein. Generally, however, they consist of a number of bladed wheels which, in the case of the turbine, are rotated in order to rotate the output shaft upon which they are mounted. In the case of the compressor, the blade and wheels are rotated by the shaft to compress the gas.

An air intake 15 provides atmospheric air to the compressor. The compressed air from the compressor is exhausted through a compressed air pipe 16 which has a heating chamber 17, such as in the form of coils in the pipe, with the pipe then opening into the turbine compressed gas inlet 18. The air entering the turbine is both compressed by the compressor as well as heated in the heating chamber 17 so that it transfers part of its energy to the turbine working mechanism (e.g., the bladed wheels), as it expands. Then the air is exhausted through an exhaust opening 19 and an exhaust pipe 20. The exhausted air is still hot, having transferred only a portion of its heat energy to the working mechanism of the engine.

The hot air from the exhaust pipe 20 enters into the housing 21 of a heating device having a combustible fuel inlet pipe 22 and a flame or combustion nozzle 23 for burning the fuel with the hot air. This provides a heating flame 24 applied to the heating chamber or coils 17, with the products of combustion of the flame or burned gas 25 then exhausting out through a stack 26 in the housing.

Restated, the general cycle of operation comprises atmospheric air entering the compressor 13, with the compressed air flowing continuously through the heating chamber 17 where it is heated by the flame 24, but is itself unburned. Thereafter it proceeds to the turbine as hot and compressed gas to operate the turbine working mechanism. Thereafter it is exhausted and returned to provide the oxygen for the flame 24, except being still hot, it improves the combustion efficiency considerably both as to the amount of fuel used and the amount of heat produced.

The combustible fuel may be in the form of a carbonaceous gas such as propane or the like or in the form of a solid particulate fuel, such as powdered coal, or oil, etc. As an alternative to using air alone, a mixture of an appropriate fuel plus air may be used as the working gas medium.

MODIFICATION — FIG. 2

Figure 2:
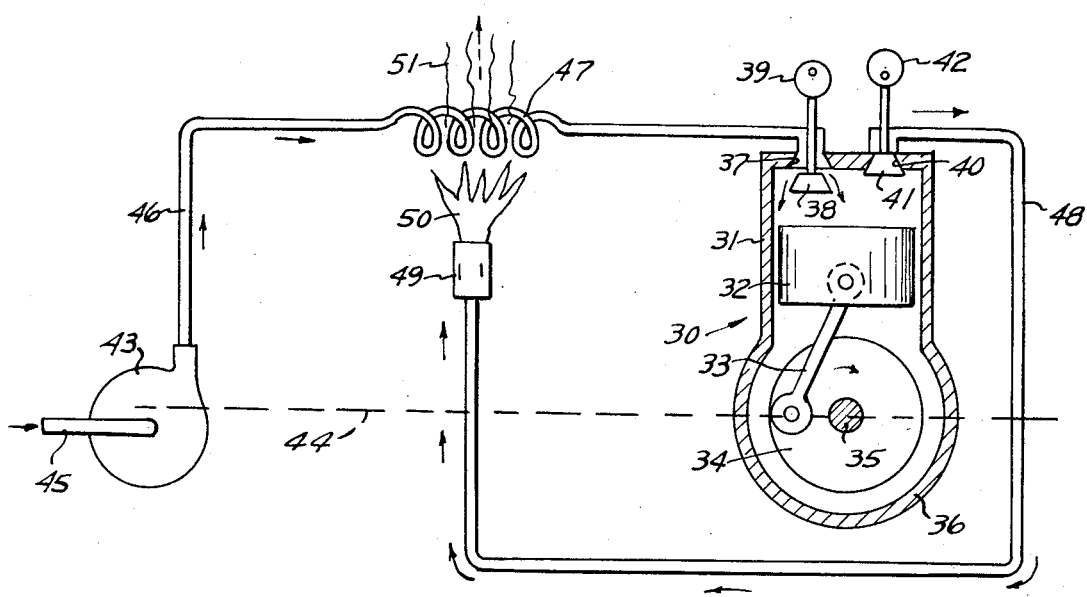
FIG. 2 is a modification illustrating, schematically, a reciprocating type of engine.

FIG. 2 illustrates, schematically, a reciprocating type engine to which the invention herein has been applied. The reciprocating engine 30 comprises a cylinder 31 containing the reciprocating piston 32 connected by a piston rod 33 to the crankshaft or flywheel 34, in turn connected to the output shaft 35. The output shaft and the flywheel are enclosed within the conventional engine casing 36.

An inlet or intake opening 37 closed by an intake valve 38, controlled by a rotating timer cam 39 permits the entry of hot compressed gas into the chamber above the piston for driving the piston. Likewise, an exhaust opening closed by an exhaust valve 41, controlled by a timer cam 42, times the exhaust of the gas from the chamber area above the piston, on the upstroke of the piston. The foregoing construction is conventional and thus, the details of construction are omitted here.

A conventional compressor 43 is coupled to the engine output shaft by means of a suitable coupling 44 (shown schematically in dotted lines) for compressing either air alone, as described above in connection with FIG. 1, or alternatively a fuel plus air mixture. The gas entering the compressor through inlet pipe 45 is exhausted through a compressed air pipe 46 having a heating chamber, e.g., coils 47, which function as a heating chamber.

After being heated, the unburned gas enters into the engine cylinder through the inlet opening 37 when the valve 38 is opened by the timer cam. The gas expands and delivers a portion of its energy to the piston for moving the piston on its work stroke and thereafter is exhausted through the exhaust opening 40 and into an exhaust pipe 48.

The unburned and used gas (illustrated as a fuel plus air mixture), still hot, is fed through pipe 48 to a burner nozzle 49 where it is ignited to produce a hot flame 50 for heating the coil 47. The products of combustion of burned gas 51 is then exhausted (see dotted arrow).

As an alternative to the fuel plus air mixture described above, air alone may be used and brought to the burner nozzle, with the fuel separately conducted to the burner nozzle as described above in connection with FIG. 1. In all cases, however, the gas which operates the engine working mechanism is unburned and is preheated by burning the gas after it has operated the engine working mechanism.

The above system of utilizing the unburned gas to operate the engine working mechanism and the engine exhaust gas to provide the combustion flame for preheating the unburned gas, results in a considerable increase in efficiency and better utilization of the energy of the fuel, with less heat waste than possible in conventional engine constructions. The increase in efficiency and reduction in waste, varies depending upon the particular type of engine utilized and its construction.

ILLUSTRATION OF OPERATING TEMPERATURE

By way of illustration, a system as disclosed in FIG. 1 may be effectively operated with the gas entering 15 at about 70°F, going through pipe 16 at about 300°F. Leaving the engine at about 1,000°F, the gas travels through pipe 20 into housing 21, and goes out the stack 26 at about 400°F.

Of course these are illustrative, and actual operating temperatures will vary in accordance with the specific types of equipment employed, operating speeds, pressures, etc.

Having fully described an operative embodiment of this invention, I now claim:

1. A method for operating the working mechanism contained within the engine chamber of an external combustion engine, comprising essentially the steps of:
   first, compressing a combustible fuel-air mixture;
   next, feeding the compressed fuel-air mixture through a closed heat exchanger chamber while heating the heat exchanger chamber, and thus heating the fuel-air mixture flowing through the heat exchanger chamber, by means of a combustion flame heater whose flame is applied to the exterior of the heat exchanger chamber;
   then flowing the now heated, compressed fuel-air mixture from the heat exchanger chamber into the engine chamber for expansion of the mixture therein and thus moving the engine working mechanism by the pressure of the expanding fuel-air mixture;
   thereafter, exhausting the said heated expanded fuel-air mixture from the engine chamber to said flame heater for fueling the flame to cause combustion and thus heating said heat exchanger chamber;
   and finally exhausting the products of combustion of the flame.

2. In an external combustion engine comprising an engine working mechanism operated by heated, compressed gas, and contained within an engine chamber having a gas input, and a compressor connected to said engine chamber gas input for compressing and feeding compressed gas into said chamber for operating said engine working mechanism, and the chamber having a gas exhaust for exhausting the gas from the chamber after utilizing the gas for work, the improvement comprising:
   said gas comprising a combustible fuel-air mixture;
   a heating chamber arranged between the compressor and engine chamber gas input through which the gas is flowed for heating the gas flowing through the heating chamber before entering the gas input but without combustion of the gas;
   a flame-type combustion heater arranged to heat the heating chamber by applying its flame thereto;
   with the engine chamber gas exhaust connected to the heater for feeding the still hot gas exhausting from the engine to the heater, for combustion of the gas to produce said flame;
   whereby the flame of the heater is produced by the hot, unburned combustible fuel-air mixture exhaust gas from the engine chamber and thereby heats the heating chamber and consequently the combustible fuel-air mixture gas flowing to the engine, and with the products of combustion from the heater flame then being exhausted.

* * * * *